United States Patent [19]
Hoppesch

[11] 3,823,601
[45] July 16, 1974

[54] ANTI-EVASION SYSTEM FOR A BREATH ALCOHOL TESTER

[75] Inventor: Joseph P. Hoppesch, Schaumburg, Ill.

[73] Assignee: Borg-Warner Corporation, Chicago, Ill.

[22] Filed: Dec. 26, 1972

[21] Appl. No.: 318,051

[52] U.S. Cl. .................................. 73/23, 23/254 E
[51] Int. Cl. .......................................... G01n 31/00
[58] Field of Search ............... 73/23, 421.5 R, 27 R; 23/254 R, 254 E, 230 R, 232 E; 128/2 R, 2.07, 2.08

[56] References Cited
UNITED STATES PATENTS

| | | | |
|---|---|---|---|
| 3,552,930 | 1/1971 | Borkenstein | 73/421.5 R X |
| 3,600,134 | 8/1971 | Noller | 73/27 R |
| 3,622,278 | 11/1971 | Elzinga | 23/254 R X |
| 3,678,489 | 7/1972 | Scherban et al. | 73/27 R X |
| 3,699,803 | 10/1972 | Sumi et al. | 73/27 R |

*Primary Examiner*—Richard C. Queisser
*Assistant Examiner*—Stephen A. Kreitman
*Attorney, Agent, or Firm*—Donald W. Banner

[57] ABSTRACT

A system for discouraging evasion of a breath tester (especially those testers designed to be used by an unsupervised or under-supervised subject) employing the effect that the response of certain detector elements (e.g., catalytic and semiconductor alcohol detecting elements) to non-alcoholic breath differs from the response or other produced for air substitutable gases. Means employing the differing responses to cause a "pass" only if the output is in a "window" between substantially the non-alcoholic breath signal and the signal level produced by breath having a predetermined alcohol concentration (e.g., 0.1 percent blood alcohol concentration) are disclosed.

4 Claims, 3 Drawing Figures

3,823,601

ANTI-EVASION SYSTEM FOR A BREATH ALCOHOL TESTER

SUMMARY OF THE INVENTION

One feature of the present invention is the employment of an effect, discovered by the present inventor, that certain catalytic type and/or semiconductor type sensors yield a response for human breath which is significantly larger than that of air, but less than that of alcoholic breath. This phenomenon is employed, in accordance with one feature of the present invention, to provide an anti-evasion system comprising means coupled to such a detector for sensing the presence of a signal representative of an output between substantially that of human breath (larger than that of air) and that of a predetermined alcohol concentration in breath (such as a 0.1 percent blood alcohol concentration).

Additional features of the present invention which are believed to be novel are set forth hereinafter. The invention, together with the further advantages thereof, may best be understood by reference to the following description taken in connection with the accompanying drawings, in the several figures of which like reference numerals identify like elements.

DESCRIPTION

Figure 1:
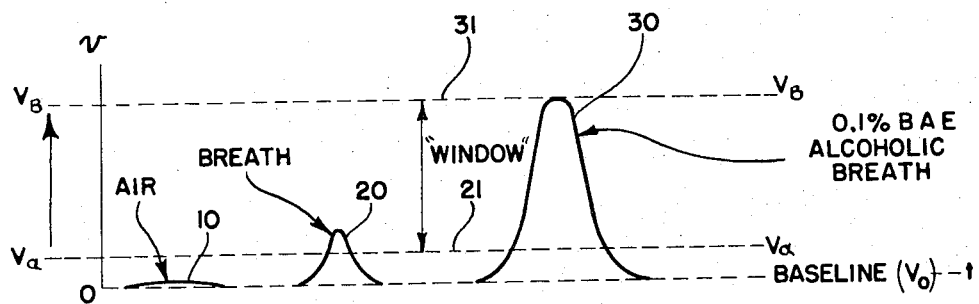
FIG. 1 is a graphical representation of the voltage output versus time from a detector in response to different inputs (air, non-alcoholic breath and alcoholic breath)

FIG. 1 depicts the output graph of the voltage derived from a detector of the type illustrated in the above cited pending applications, when such a detector is exposed to air (curve 10); that of the typical alveolar breath of one who has not ingested alcohol is shown in curve 20. Lung breath having 0.1 percent blood alcohol concentration is shown in curve 30. The present inventor discovered, that curve 20 results from non-alcoholic human breath using certain detectors such as: catalytic combustion detectors of the two element bead type, where the catalyst is a precious metal and the bead is $Al_2O_3$, and n-type semiconductor detectors consisting of tin or zinc oxide and $Al_2O_3$. This phenomenon is not fully understood, but it is expected that it is related to chemical effects of the water and carbon dioxide on the detector element.

The present invention uses this phenomenon to set up a "window" range between substantially (e.g. 75%) the peak value of curve 20 (i.e., the voltage $V_a$, dashed line 21) and the peak of curve 30 (voltage $V_B$, dashed line 31), between which values the peak detector signal must lie to permit a "pass" of the test.

Figure 2:
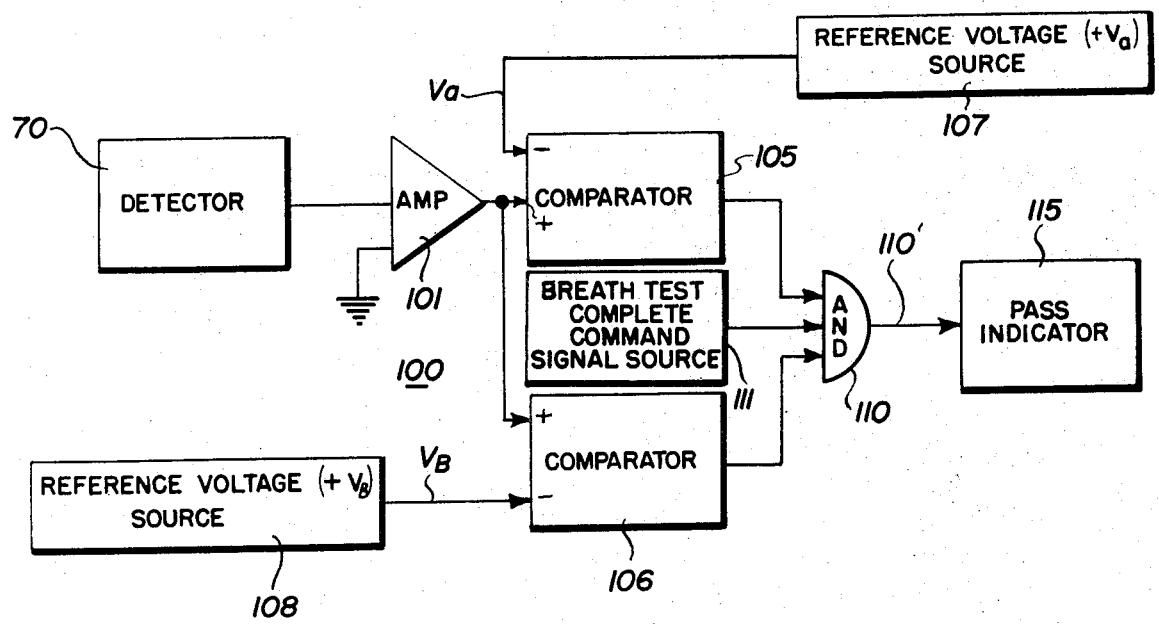
FIG. 2 is a block diagram of an anti-evasion system embodying the present invention.

Referring to FIG. 2, there is depicted a system 100 constructed in accord with the present invention. The system 100 includes means (a detector 70, which may be identical to the detector 70 of the above-referenced application Ser. No. 136,921, and an amplifier 101) for producing an electrical signal of a significant magnitude above that of ambient air, but below that of significant quantity alcohol-containing breath.

This signal is coupled to a pair of comparators 105 and 106. The signal is coupled to the positive primary input of comparators 105 and 106, while their negative primary inputs are connected to respectively sources 107 and 108 of $+V_a$ and $+V_B$ (the same voltages as in FIG. 1). The outputs of the comparators are two of the inputs of a three input AND gate 110. The other input is a breath test completed command signal source 111 (which may be the relay K4 of the aforesaid 136,921 application).

Thus, only when all three inputs to gate 110 are present can a signal on its output be present. The output 110' serves as a "pass" indication signal which drives a pass indicator 115.

The comparators 105 and 106 and associated sources 107, 108, the source 111 and gate 110 serve as means for receiving the detector output signals and for preventing a pass signal for signals either below the signal $V_A$ or above $V_B$. That is, for preventing a pass signal unless the output at the test time is within the window of FIG. 1.

Figure 3:
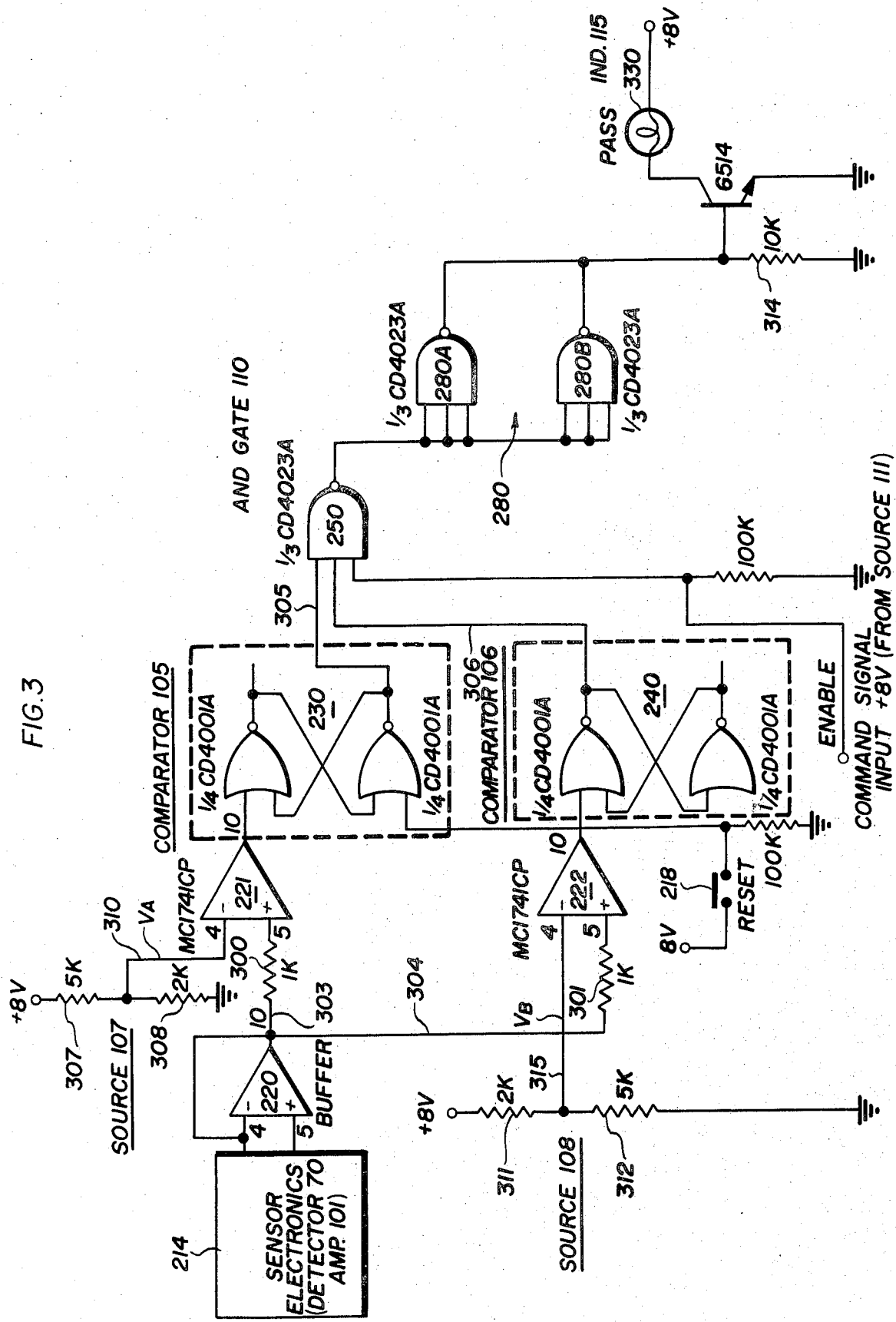
FIG. 3 is a circuit diagram partially in block form illustrating one specific embodiment, as an example, for the system of FIG. 2.

Referring now to FIG. 3, one concrete example for the system 100 is there depicted in detail. The element values of this example are listed directly on the drawings as well as their interconnections.

The system 100 of FIG. 3 includes alcohol sensor electronics unit 214 (this may be the detector 70 and electronics of the aforementioned Ser. No. 136,921 application). The detector 70 may employ, for example, a Bacharach 800.080.2 detecting element or a General Monitors Minidetector element. The voltage derived from the detector is connected to the input of an operational amplifier 220 at the primary negative input (conventionally numbered) 4 and primary positive input 5. Operational amplifier 220 serves as a buffer stage for impedance matching to the elements making up the comparators 105 and 106. The output 10 of operational amplifier 220 is connected to its primary negative input and to resistor 300 and resistor 301 by lines 303 and 304 respectively. The other end of resistor 300 is connected to the positive primary input of an operational amplifier 221 (part of comparator 105) and the other end of a resistor 301 is connected to the positive primary input of an operational amplifier 222 (part of comparator 106).

A voltage divider circuit serves as source 107 and comprises two series connected resistors 307 and 308 whose junction is connected by line 310 to the primary negative input of operational amplifier 221. The other ends of resistors 308 and 307 are respectively connected to a plane of reference potential (e.g., chassis ground) and plus 8V, and the relative values of resistors 307 and 308 are selected to produce a reference voltage of $V_A$ on line 310. (In this example $V_a = 16/7$ volts.) A well regulated voltage source of, e.g., 8V and a second pair of series connected resistors 311 and 312 form another voltage divider which serves as the source 108. One end of resistor 311 connected to the voltage source (8V) and one end of resistor 312 connected to ground. The common junction of 311 and 312 is connected by line 315 to the primary negative input of operational amplifier 222. The values of the resistors 311 and 312 are chosen to establish $V_B$ on line 315. (In this example 40/7 volts.) These voltage dividers thus serve to set or determine the "window" range in which the peak detector signal must fall in order to obtain a "pass" condition.

A reset means 218 is provided (which may be part of the unit 214 and could be for example reset by the READY light of the aforementioned application).

The output of operational amplifier 221 is connected to the input of flip flop 230. The output of operational amplifier 222 is connected to the input of flip flop 240. The flip flops 230 and 240 are connected by lines 305 and 306 respectively to the gate 250.

The enable command signal may be derived from a timer (not shown) set to produce a +8V signal at some predetermined time after sampling. The output of NAND gate 250 is connected to the inputs of NAND gates 280A and 280B which form a driving inverter. The two NAND gates of 280 serve to provide a sufficient current source for this transistor. The output of gates 280A and 280B are connected respectively to the base of transistor 6514. A resistor 314 is connected between the base of transistor 6514 and ground. The emitter of transistor 6514 is connected to ground. The pass indicator 115 is here a lamp 330 connected to the collector of transistor 6514. The other lead of indicator 330 is connected to e.g., +8V.

The series connection between the NAND gate 250 and the NAND gate pair 280 serves to provide the logical AND gate 110 with a sufficient current output to operate the transistor 6514 and light the lamp 330 if and only if the three inputs on lines 305, 306 and from the source 111 are present. Thus, this can occur only when the signal from the detector 70/electronics 214 is in the window between $V_A$ and $V_B$.

The human breath sill level determined by the detector 70 has been established by the present inventor to be due to primarily humidity in the case of the aforementioned Backarach detector and to $CO_2$ in the case of the above mentioned Minidetector.

It should also be noted that the present invention includes, in at least its broader aspects, the concept of the use of other sensors besides the alcohol sensor to establish sill and lintel of the window. For example an additional sensor could be employed to sense the humidity or water vapor in the gas entering the tester. As breath is saturated with water vapor at its normal temperature (approximately 37°C) it maintains a partial pressure of approximately 47 mm Hg. while stored breath is usually cooled and has reduced water vapor content. Ambient air will also usually have a lower water vapor content. Thus, the lower sill of the window could be provided by providing a minimum humidity signal for a constant temperature sample. (e.g., heated to 50°C.)

Also such a humidity sensor could be used to provide the lintel for the window by reacting to too high of a humidity level to prevent avoidance by water being poured into the breath tester breath unit.

Further, logic could be constructed to require two windows, a humidity window as well as an alcohol detecting element window. However, the embodiment as disclosed above in detail is preferred as it employs the alcohol detector for two functions and is thus more economic to make and use.

As should now be clear, the present invention provides a system for discouraging evasion of a breath tester that is especially useful in such testers that are to be operated by a subject who is unsupervised or undersupervised. An example is the automobile interlock where the driver must blow his breath into an analyzer before the automobile will be operable.

While a particular embodiment of the invention has been shown or described, it will be obvious to those skilled in this art that changes and modifications may be made without departing from the invention in its broader aspects. It is therefore the intent of the following claims to cover every form that the invention may assume including improved forms which may merit patents of their own, and those forms that differ in appearance from the form herein described.

What is claimed is:

1. A breath tester comprising;
   means for producing electrical signals in response to gas samples supplied to the tester, said signal means producing signals of one magnitude for ambient air, signals of second magnitude, significantly above that produced for ambient air, for a non-alcoholic breath sample and for producing signals of a yet higher magnitude for breath samples containing significant concentrations of alcohol;
   means for producing a pass indication;
   third means, coupled to receive signals from the aforementioned signal means and coupled to said pass indication means, for at least preventing the production of a "pass" by said pass indication means for signals below a substantial part of the second magnitude signal produced by non-alcohol containing breath and for also preventing the production of a "pass" for signals above a predetermined higher magnitude corresponding to the signals produced by a predetermined significant alcohol concentration in a breath sample.

2. The breath tester of claim 1 wherein:
   said signal producing means is a single detector of the type that responds to human breath to produce a signal of a significant magnitude and responds to alcohol containing human breath to produce signals of higher magnitudes.

3. The breath tester of claim 2 wherein:
   said third means includes:
   source means for producing two reference signals ($V_A$ and $V_B$) one of whose magnitude is equal to a significant part of the significant magnitude signal for non-alcohol containing breath and the other of whose magnitude is equal to the magnitude of a signal from a predetermined significant alcohol concentration containing breath sample;

two comparators coupled to receive respectively said one reference signal and said other reference signal and both coupled to receive the signals from the signal producing means and for respectively producing an output when the signal from said signal producing means is above and below said one and other reference signals; and an AND gate coupled to govern the pass indicator for producing an output "pass" signal to cause said pass indicator to indicate a pass only if both of said comparator signals are present.

4. In a breath tester of the type having output apparatus which produces an output in response to a gas sample tested with an alcohol detector, capable of yielding an electrically detectable response, which response is of significant magnitude above that of ambient air for non-alcoholic breath and a response of a still greater magntiude for alcoholic breath the improvement comprising:
  means responsive to said alcohol detector whose response is indicative of the gas tested, such means responding differently to responses within and without of preset magnitudes; and
  means coupled to first said means for not producing a "pass" signal for such detector responses that are below a substantial part of the significant response produced by non-alcoholic breath such means including provisions for not producing a "pass" signal for responses produced by a predetermined alcohol concentration.

* * * * *